United States Patent
Zappoli et al.

(10) Patent No.: US 10,694,764 B2
(45) Date of Patent: Jun. 30, 2020

(54) APPARATUS AND METHOD FOR PREPARING AND DISPENSING A SINGLE DOSE OF A FOOD PRODUCT AND A RELATIVE SINGLE-DOSE UNIT

(71) Applicant: RDL S.r.l., San Giorgio di Piano (IT)

(72) Inventors: Alberto Zappoli, Pontecchio Marconi (IT); Roberto Demontis, Sala Bolognese (IT)

(73) Assignee: RDL s.r.l., San Giorgio di Piano (IT)

( * ) Notice: Subject to any disclaimer, the term of this patent is extended or adjusted under 35 U.S.C. 154(b) by 566 days.

(21) Appl. No.: 15/104,295

(22) PCT Filed: Dec. 12, 2014

(86) PCT No.: PCT/IB2014/066839
§ 371 (c)(1),
(2) Date: Jun. 14, 2016

(87) PCT Pub. No.: WO2015/092637
PCT Pub. Date: Jun. 25, 2015

(65) Prior Publication Data
US 2016/0316781 A1    Nov. 3, 2016

(30) Foreign Application Priority Data
Dec. 19, 2013   (IT) .............................. BO2013A0695

(51) Int. Cl.
*A23G 9/28* (2006.01)
*A23G 9/52* (2006.01)
*A23G 9/30* (2006.01)

(52) U.S. Cl.
CPC ................ *A23G 9/28* (2013.01); *A23G 9/30* (2013.01); *A23G 9/52* (2013.01)

(58) Field of Classification Search
CPC ................ A47J 31/0668; A47J 31/3623; A47J 31/3666; A47J 31/3676; A47J 31/50; A23G 9/30; A23G 9/52
(Continued)

(56) References Cited

U.S. PATENT DOCUMENTS 3,680,653 A * 8/1972 Murata .................... B60G 3/00
                                                       180/23
3,858,498 A    1/1975 Swenson
(Continued)

FOREIGN PATENT DOCUMENTS

CN     101190000 A     6/2008
CN     101263838 A     9/2008
(Continued)

OTHER PUBLICATIONS

International Search Report and Written Opinion for corresponding Patent Application No. PCT/IB2014/066839 dated Mar. 25, 2015, pp. 1-9.
(Continued)

*Primary Examiner* — Ibrahime A Abraham
*Assistant Examiner* — Biniam B Asmelash
(74) *Attorney, Agent, or Firm* — Renner, Otto, Boiselle & Sklar, LLP (57) ABSTRACT

Described is an apparatus for preparing and dispensing a single dose of a food product comprising: —means (2) for feeding a solvent liquid having at least one duct (28) for dispensing the liquid; —a cavity (11) for housing a single-dose unit (50) of a food product comprising an inlet connected to the duct (28) for dispensing the liquid designed for feeding the liquid to the single-dose unit (50); the cavity having at least one duct (8) for transferring the product-liquid mixture; —a unit or chamber (9) for cooling the mixture fed by the transfer duct (8) inside the cooling unit;
(Continued)

—a unit (14) for dispensing the product formed inside the cooling unit (9) connected to the same unit, for dispensing the product formed in a single dose.

13 Claims, 5 Drawing Sheets

(58) Field of Classification Search
 USPC .................. 99/295, 284, 290, 289 R, 302 R
 See application file for complete search history.

(56) References Cited

U.S. PATENT DOCUMENTS

| | | | | |
|---|---|---|---|---|
| 5,463,878 | A | * | 11/1995 | Parekh .................... A23G 9/28 222/146.6 |
| 5,803,377 | A | | 9/1998 | Farrell |
| 2008/0127837 | A1 | * | 6/2008 | Cocchi .................... A23G 9/28 99/483 |
| 2008/0226770 | A1 | | 9/2008 | Cocchi et al. |
| 2008/0226779 | A1 | * | 9/2008 | Cocchi ................... A23G 9/228 426/231 |
| 2009/0186141 | A1 | | 7/2009 | Almblad et al. |
| 2011/0109171 | A1 | * | 5/2011 | Capano .................. F04D 7/045 307/126 |
| 2012/0217264 | A1 | * | 8/2012 | Cocchi ..................... A23G 9/04 222/95 |
| 2012/0251697 | A1 | * | 10/2012 | Cocchi .................. A23G 9/045 426/521 |

FOREIGN PATENT DOCUMENTS

| | | |
|---|---|---|
| CN | 102669397 A | 9/2012 |
| DE | 30 19 347 A | 12/1981 |
| EP | 1 943 906 A2 | 7/2008 |
| WO | 01/81199 A1 | 11/2001 |
| WO | 03/096820 A1 | 11/2003 |
| WO | 2006/017893 A1 | 2/2006 |
| WO | 2013/121421 A1 | 8/2013 |
| WO | 2015/104610 A1 | 7/2015 |

OTHER PUBLICATIONS

Search Report for corresponding Italian Patent Application No. BO20130695 dated Aug. 22, 2014, pp. 1-9.
"Advertisement", Confectionery Production, Specialised Publications Ltd., Surrey, GB, vol. 56, No. 8, Aug. 1, 1990, p. 586.

* cited by examiner

APPARATUS AND METHOD FOR
PREPARING AND DISPENSING A SINGLE
DOSE OF A FOOD PRODUCT AND A
RELATIVE SINGLE-DOSE UNIT

This application is a national phase of International Application No. PCT/IB2014/066839 filed Dec. 12, 2014 and published in the English language, which claims priority to Italian Patent Application BO2013A000695 filed Dec. 19, 201, where are hereby incorporated herein by reference in their entirety.

TECHNICAL FIELD

This invention relates to the field of preparation, production and dispensing of food products in a liquid or semi-liquid (creamy) state. More specifically, it relates to infusion or extraction products (such as, for example, coffee) or ice cream products.

BACKGROUND ART

The expression "infusion or extraction products" refers to all those beverages defined as mixtures, that is, the mix of two or more substances (components of the mixture, solvent and solute) mixed together, the composition of which is variable within a more or less large range; usually, they have water as the base liquid and infusions of various kinds as the solute.

For this purpose, single-dose units containing the product are used for the preparation of hot beverages (coffee, tea, chamomile, etc.). These single-dose unit may be, for example, capsules or pods containing a food preparation comprising the basic food product in powder or leaf form and from which the desired beverage is obtained by infusion or dissolving in a hot liquid.

There are countless types of apparatuses designed for producing and preparing these types of products an they will not be described here since they are described in detail in prior art.

The term "ice cream product" is used to mean a food product the production of which gives ice creams, sorbets, cold custards and water-ices, also known as granitas. Their preparation, storage and consumption temperature is close to 0° C., with a variability of from −1.5 to −10° C., considering the average temperature of use of −2° C. for the cold custards, −4° C. for the ice creams and −6° C. for the water-ices.

Ice cream and cold custards are food products obtained from a relative mixture of ingredients which are changed to the semi-solid (or creamy) or solid state by cooling, or freezing, after mixing the respective ingredients in the presence of air, in a cooling chamber.

The mixed food product obtained in this way incorporates a prominent amount of air (at least 40%, by volume) and it is precisely this presence of air which gives it the creaminess or softness typical of ice cream.

In the case of preparation of so-called "artisan" ice cream, a relatively large quantity of ice cream is produced (using suitable machines equipped with vertical axis mixing cylinder—for example—in which the mixture of components is prepared and placed) which, once produced, must be transferred from the above-mentioned machine into special multi-portion containers (which typically contain several kilogrammes and are displayed in the counters of ice cream parlours).

We thus have the production of vanilla ice cream, chocolate ice cream and so on. The respective containers must be positioned and kept in a chiller counter or freezer also at the moment of sale, when the ice cream is portioned for take-away consumption in a suitable container, for example a tub or a takeaway cone or even a larger container.

This means a high energy consumption and the availability of a suitable space for a display counter/freezer (known in the jargon of the trade as "well") for storing ice creams having different flavours in different wells.

It should also be noted that the storage temperatures in these display counters/containers is very low (about −18° C.) so as to keep the product even for a few days and this element is certainly not a positive aspect for the enjoyment of the ice cream by the consumer: the ideal temperature should be around 0° C. so as not to desensitise the taste buds of the end consumer.

The same drawback also occurs in the case of ice cream produced industrially and packed in multi-portion trays for the subsequent portioning, in an ice cream parlour, into individual portions.

In this latter case, the only difference consists in the fact that the preparation of the ice cream product occurs far from the place of sale and, therefore, during the transport, it must be kept at an even lower temperature, of about −25° C.

In practice, in both cases, there is the problem of the presence of a cold chain (production—transport—storage on site) which seriously influences both the energy consumption costs and the consumer satisfaction (in terms of flavour).

Furthermore, another drawback, which is certainly not negligible, should be considered, which consists in the limited duration (a few days) of the product before it degrades, meaning it must be replaced with a fresher one.

In addition to these more widespread types, there are apparatuses designed as distribution units for preparing ice cream or water-ices which are able to dispense a quantity/dose, that is to say, a full portion or a part of a portion in the case of multi-flavour ice cream.

This apparatus comprises, in any case, the use of one or more mixing chambers inside which a reasonable quantity of ice cream product is prepared and stored.

The latter is obtained using a mixture of basic ingredients (usually powder) which can typically be diluted using water or milk.

The apparatus comprises the mixing chamber to contain the quantity of product ready for use; a cooling unit for refrigerating the chamber; a stirrer, typically helical, for continuously mixing the product contained in the refrigerated chamber; and a dispensing device (for each product receptacle), which can be operated by hand, for dispensing the ice cream or the water-ice in a suitable receptacle.

The mixing chamber is designed to allow the preparation and/or the containment of approximately 3 kg of product, which, once obtained, must be kept cold under continuous stirring as it would otherwise harden.

For this reason, especially when the quantity produced is greater than the planned consumption over a period of time (for example, daily), the apparatus results in a considerable energy consumption compared with the quantity of food product contained therein.

Moreover—as also in the above-mentioned cases—the bacterial charge in the food product increases quickly and consequently it is advisable from a hygiene point of view to store the product in the mixing chamber only for a few days.

There are, lastly, prior art solutions which comprise a single-dose capsule filled with ice cream product ready for use (prepared upstream inside particular systems and then transported to the place of final distribution, and consequently with all the problems of the cold chain specified above).

The capsule is removed from the freezer (traditional) and placed inside a cavity of an apparatus acting as press which—pressing on an end of the capsule—gradually empties the product which, exiting from it, positions itself inside the container (cone or tub) for use by the end consumer.

In all the above-mentioned cases there is, therefore, on the one hand, the problem of the production of large quantities of product which must be then managed and stored (forming part of the prior art "cold chain"), whilst, on the other hand, there is the problem of the dose or single portion which, however, also consists of ice cream product (or other product type) ready for use and in any case stored inside freezers.

In short, the apparatuses or sets of elements require a management extended to a plurality of production components, together with the problems of duration of the product which always has a natural shelf life.

AIM OF THE INVENTION

The main aim of this invention is to provide an apparatus which allows the production of a food product, that is, the preparation and dispensing of it, in the form of a single dose requested at that moment.

In this way it is possible to reduce and/or eliminate the above-mentioned drawbacks relating to the current means of production, especially in the ice cream sector (ice cream, custards, water-ices) and in general of the food products for which the preparation, storage and consumption temperature is close to or less than 0° C.

A further aim is the reduction of the production costs relating to the food products, guaranteeing, at the same time, the safe hygiene of the products.

A further aim is the elimination of waste of food products, as the step for storing excess product is eliminated in the ready to eat form.

Another aim is that of producing both ice cream products and infusion or extraction products in a single apparatus.

Another aim of this invention is to provide a method which allows the production of a food product, such as ice cream products, that is, the preparation and dispensing of it, in the form of a single dose requested at that moment. This applies both for ice cream products—mainly—and for infusion or extraction products. The further aims mentioned above are achieved with this method.

A further aim is to provide and use a single-dose unit with which it is possible, together with a suitable and correlated apparatus, to obtain an ice cream product in the form of a single dose.

The above-mentioned aims are achieved according to any one of the accompanying claims.

For the purpose of this description and claims, the expression "dose to be consumed by a single person in a single use of the food product" is used to mean both an entire portion of the food product for a person and a part of that portion.

If reference is made to an ice cream product, this definition is applicable to the case of a single flavour dose (for example, a water-ice, or a takeaway single-use ice cream), or to the case of a multi-flavour food product intended for a single use.

Similarly, in the case of infusion or extraction products, as described above.

BRIEF DESCRIPTION OF THE DRAWINGS

The features of the invention are highlighted below with the description of the preferred embodiments, with reference to the accompanying drawings, in which.

DETAILED DESCRIPTION OF PREFERRED EMBODIMENTS OF THE INVENTION

With reference to the accompanying drawings, the apparatus according to this invention for preparing and dispensing a single dose of a food product comprises:

- means 2 for feeding a solvent liquid having at least one duct 28 for dispensing the liquid;
- a cavity 11 for housing a single-dose unit 50 of a food product comprising an inlet connected to the duct 28 for dispensing the liquid designed for feeding the liquid to the single-dose unit 50; the cavity having at least one duct 8 for transferring the product-liquid mixture;
- a unit or chamber 9 for cooling the mixture fed by the transfer duct 8 inside the cooling unit;
- a unit 14 for dispensing the product formed inside the cooling unit 9 connected to the same unit, for dispensing the product formed in a single dose.

The above corresponds to the minimum configuration for preparing and dispensing a food product in the form of the ice cream product.

As will be seen in more detail below, it is possible, within the same structure, to also obtain, alternatively, the preparation and dispensing of a different food product, such as an infusion or extraction product, such as coffee, tea, camomile or infusions of various kinds.

In that case, there will be selector means, associated with the housing cavity of the single-dose unit (or capsule as it may also be defined below), which are able to control the transfer of the mixture of product towards a second transfer duct distinct from the first duct.

In the drawings, the identical components are labelled with the same numerical references and they will have similar features unless indicated otherwise.

The apparatus 100 according to the invention is an apparatus for preparing a food product—the features of which have already been highlighted above—and the dispensing of a single dose of the food product.

In the case of ice cream products, the preparation, storing and consumption temperature is close to or less than 0° C.

In the case of infusion or extraction products, their temperature varies depending on the product itself, and is approximate to the boiling temperature.

The single-dose unit, or capsule, 50 (illustrated in FIG. 1 with regard to ice cream products and in FIGS. 2, 3a and 3b with regard to infusion or extraction products) contains the food product to be used for preparing and dispensing a single dose of the food product, in which the dose is consumed by a single person in a single use of the food product.

The single-dose unit 50 can be housed in a housing cavity 11 made in the apparatus 100 so as to allow the preparation of the dose of food product.

The single-dose unit is disposable, in the sense that it is used only once for preparing the single dose, even if then—according to the traditional standards—it may be recycled, but outside the environment of the normal end user.

In the case of ice cream products, the capsule will be preferably filled with powder preparation, such as that used traditionally for making "artisan or industrial" ice cream described more fully in the prior art and the components of which are fats, proteins, sugars, etc.

This preparation may be dissolved simply with water (such as, for example, ¼ to ¾ of water) acting as solvent in such a way as to form a mixture which will achieve the final product-ice cream result.

Similarly, in the case of syrups for which the basic preparation is in a granulated or pasty form, again to be dissolved in water.

In the case of infusion or extraction products, the capsule will contain coffee in powder form or a quantity of different infusion.

The are two case studies which are completely different but which can coexist, that is, be made, on the apparatus.

The preparation of the ice cream product comprises, firstly, a mixing with a solvent liquid and, subsequently, a cooling of the mixture obtained in the ready to use form.

Figure 6:
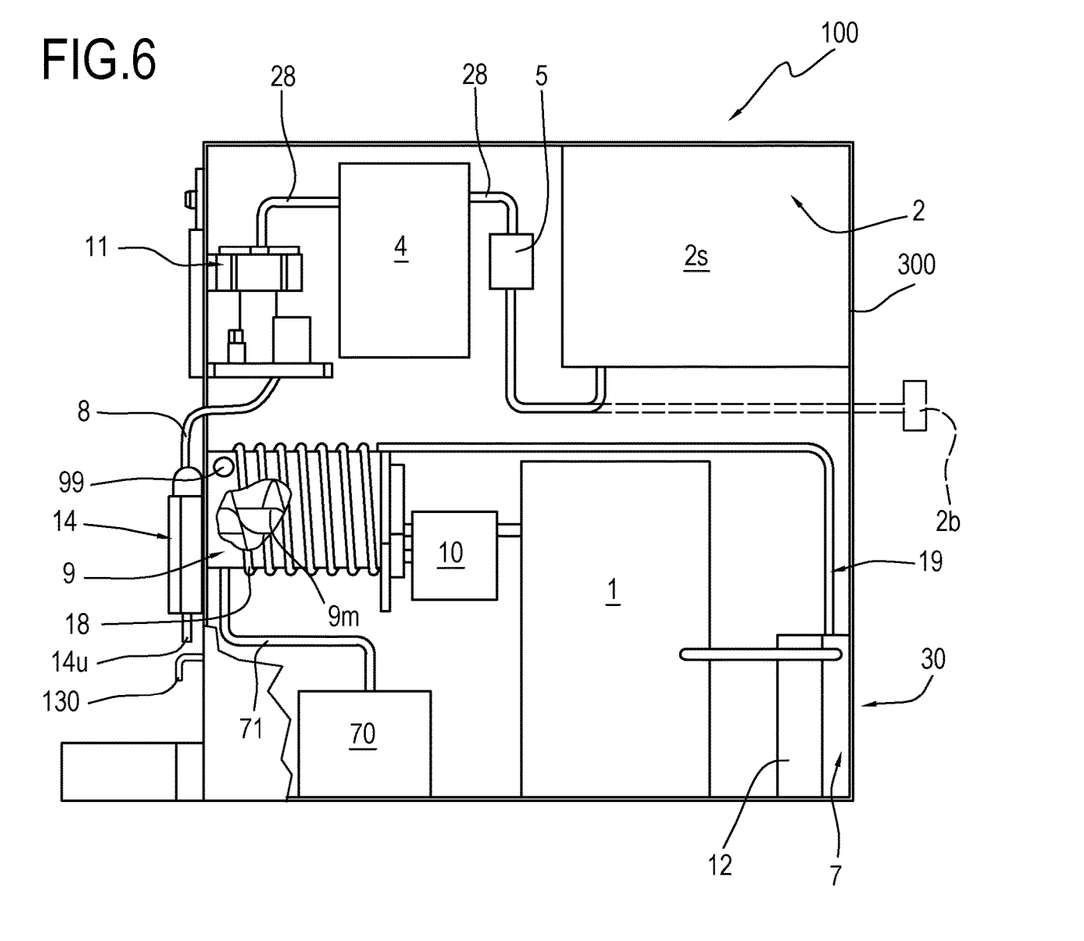
FIG. 6 is a schematic side view of the apparatus of FIG. 4 with some parts cut away for clarity.

With reference in particular to FIG. 6, the apparatus 100 can be defined as a stand-alone, compact machine, mainly for private or family use; this definition highlights the reduced dimensions of the apparatus itself and the possibility—which is a fundamental aspect—of generating a single dose of end product starting from a single dose of initial food product contained inside a disposable single-dose unit or capsule.

This also means that the machine does not need to keep product ready for use, but only operates when required by the user.

The initial portion of the apparatus comprises means 2 for feeding a solvent liquid (preferably water) having an inlet pipe 2b for connection to the water mains or, more advantageously, to a tank 2s for storing liquid in the machine; a pump 5 and at least one duct 28 for feeding the liquid which thus flows from the tank 2s, or from the mains 2b, to the single-dose unit 50.

The solvent liquid, mixing with the food product-solute, forms a mixture which is transferred, using a transfer duct 8, to a unit or chamber 9 for cooling the mixture fed by the transfer duct 8 into the cooling unit.

Preferably, the apparatus 100 comprises heating means 4, for example a boiler, for heating the liquid flowing inside the duct 28. The heating temperature, or solubilisation temperature useful for preparing the mixture, varies with the variation of the operating needs: it also varies also as a function of the composition of the food product used, preferably from 65° C. to 80° C.: with the main purpose of activating the thickening components.

The mixing chamber 9 is made of thermally conductive material, to contain the mixture of ingredients, ready for use, for preparing the food product at a temperature close to or less than 0° C. With this definition, which is also repeated below, it should be noted that the temperature may vary from −1.5° C. to −10° C.; for example −6° C. for the water-ices, −4° C. for the ice creams, −2° C. for the cold custards.

A cooling unit 30 for cooling the mixing chamber 9.

Mixing means 9m, illustrated schematically in FIG. 6 and in detail in FIG. 7, are positioned inside the mixing chamber, for mixing the contents of the mixing chamber 9 to obtain and maintain the food product in the semi-solid or pasty form (typical of the ice cream or of the water-ices).

Dispensing means 14 are positioned outside the apparatus 100 (more precisely, at the outlet of the mixing chamber) for dispensing the dose of finished food product.

The mixing chamber 9 is designed—precisely because the machine has been designed for single use—to contain a single dose of the mixture deriving from the food product whilst this is mixed by respective mixing means 9m.

Figures 4, 5:
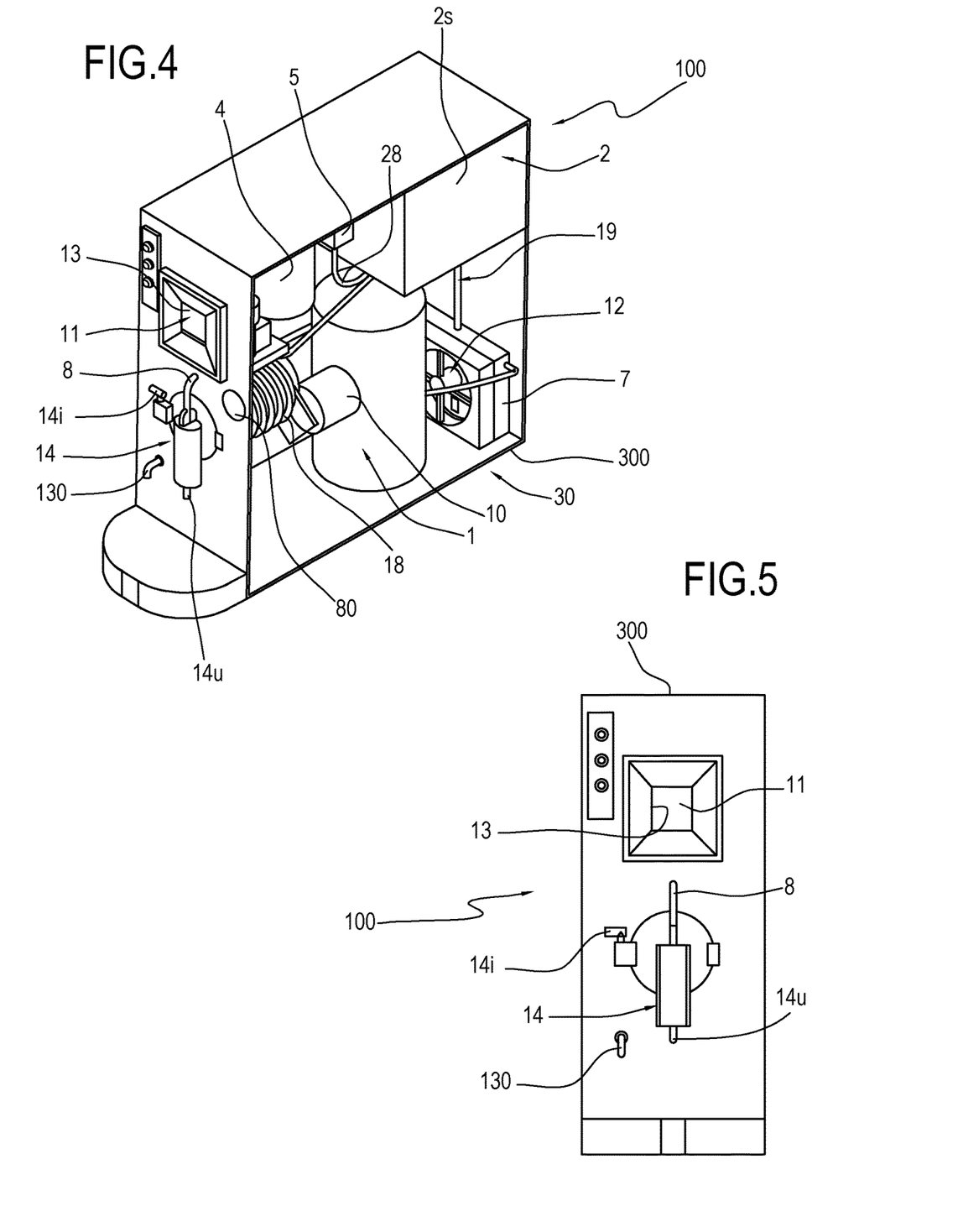
FIG. 4 is a schematic perspective view of an apparatus according to the invention with parts cut away for clarity.
FIG. 5 is a schematic rear view of the apparatus of FIG. 4.

As shown in FIGS. 4 and 6, the cooling unit 30—of the prior art type known to sector technicians—comprises: a compressor 1, a condenser 7, a fan 12 and a cooling circuit 19.

The mixing chamber is cooled externally by an evaporator 18 forming part of the cooling circuit 19 and having a tubular shape, and wrapped in a spiral form around the chamber 9.

This chamber 9 is positioned inside a box-shaped casing 300 provided in the apparatus 100 at the dispensing means 14 outside the casing 300.

The food preparation contained inside the capsule 50 may be a food preparation (that is to say, a mixture of ingredients, ready for use or concentrated) for preparing a food product such as: ice creams, sorbets, water-ices, cold custards and puddings.

In the case of food preparations for preparing ice creams, these comprise mixtures of dry powder as described above to be diluted with water.

In the case of food preparations for preparing water-ices, they are in the form of syrups or granulated mixtures comprising quantities of sugar such as to form at least the 30% of the final product.

In the case of infusion or extraction products, they will be in powder, pellet or leaf form.

The single-dose containment unit 50 is a single-dose pod or capsule.

The choice indicated above is preferable as it allows longer storage.

Preferably, the capsule is equipped with overwrapping.

It also favours the dilution with a predetermined quantity of food liquid which is transferred and made to flow through the capsule before it reaches the dispensing duct 8 which, in the case of producing ice cream products, transfers the mixture into the mixing chamber 9.

Figures 1, 2, 3A, 3B:
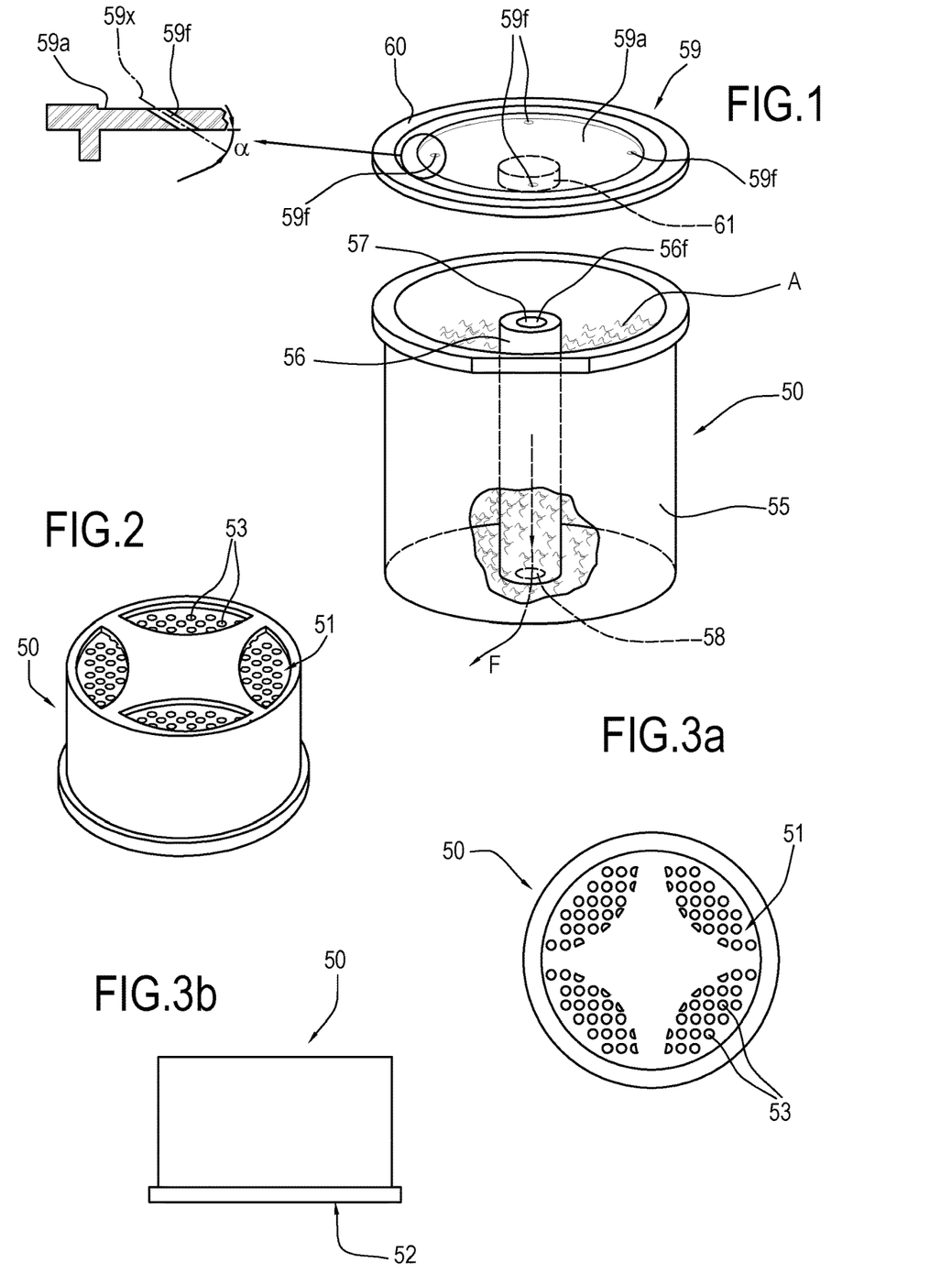
FIG. 1 is a perspective view, with some parts cut away to better illustrate others, of a single-dose containment unit according to this invention and designed for preparing ice cream products.
FIG. 2 is a perspective view of a single-dose unit for preparing infusion or extraction beverages.
FIGS. 3*a* and 3*b* are, respectively, upper and side views of the single-dose unit of FIG. 2.

It should be noted that the structure of the capsule 50 used for preparing ice creams is formed as follows.

As shown in FIG. 1, the structure comprises a lower body 55 with a cylindrical shape.

A tubular protuberance 56, perforated to its full height in 56f, and forming an upper opening 57 and a lower opening 58 which is in communication with the outside, extends from the base, internally and centrally.

There is an upper member 59 acting as lid, equipped with an edge 60 which operates as a contact element with the upper opening of the body 55 for the relative sealed closing.

The reference numeral 61 denotes a shim facing towards the inside.

The shim, when the lid is closed, comes into contact with the end portion of the protuberance 56 closing the hole of the upper opening 57.

This capsule is filled with the food product A shown with a dashed line and partly in view in FIG. 1.

A plurality of holes 59f are made at the annular zone 59a of the lid (there are four in FIG. 1 equidistant from each other).

These holes 59f have orientation axes 59x inclined by an angle α relative to the plane of the lid.

The purpose of these holes is to allow the introduction of the solvent liquid inside the single-dose unit and the angle of the holes 59f facilitates the occurrence, inside the body, of a turbulence which facilitates the mixing with the product in powder and the total emptying of the product from the capsule.

The emptying is performed since the solvent liquid, being introduced inside the container-capsule under high pressure, allows a slight deformation of the lid upwards, a detachment of the shim 61 from the central protuberance 56, an opening of the hole 57 and, consequently, a flow of the resulting mixture towards the outside, that is, outside the bottom hole 58 according to the direction illustrated by the arrow F. In short, this solution makes it possible to keep the capsule closed in the rest position (not in use) and allows the opening of the capsule—by acting as a valve—during the mixing, operating inside the apparatus.

The solvent liquid is, preferably, fed at a high temperature (within the values specified above) in order to better favour the mixing and to reduce the times.

Depending on the case and on the product used, it can also be fed at ambient temperature, that is to say, not heated.

In the case of infusion or extraction food preparations, the capsule may not be shaped as shown in FIG. 2, that is, with perforated surfaces 51, 52 which involve a plurality of holes 53; internally it has a porous partition in contact with the walls 51, 52 which is permeable to the liquid and which holds the food preparation inside the capsule 50. This avoids the presence of perforating means inside the housing 11 of the capsule; in this case, the housing 11—and, consequently, the surrounding structure of the machine—may receive both the capsule of FIG. 1 and that of FIG. 2, obviously with related and suitable containing elements which are interchangeable.

The apparatus is completed by the following components:

an over-pressure system 70, comprising a simple diaphragm pump, the delivery line 71 of which leads inside the cooling unit; its function, as will be explained in detail below, is, mainly, to favour the ejection of the product already mixed;

a device 80 for measuring the softness of the product inside the mixing chamber. This device may simply be an ammeter or a wattmeter which is able to measure the current absorbed by the motor 10 for rotating the mixing means 9m. The creamier the product, the higher will be the value indicated by the device.

The solutions described above are without doubt the preferred embodiments, because, although indirectly, they measure a variable linked to a component located outside the mixing chamber. This does not mean that other solutions may not be adopted, such as, for example, the use of a thermometer which measures the temperature of the product during mixing inside the relative chamber.

The dispensing unit 14 comprises a simple ON/OFF valve controlled by a grip 14i (which the operator will pull towards the outside) and which places in communication the inside of the mixing chamber with an outlet spout schematically indicated with numeral 14u in FIG. 4.

The mixing chamber is preferably equipped, at its front portion close to the dispensing unit 14, with a vent hole 99 for the reasons described in more detail below.

FIG. 6 illustrates the housing cavity 11, generically defined in this way, which, in the apparatus according to this invention, has two different configurations depending on whether the capsule 50 is provided for preparing ice cream products or for infusion or extraction products.

The positioning is carried out by means of a suitable opening 13 made in the box-shaped casing.

Figure 7A:
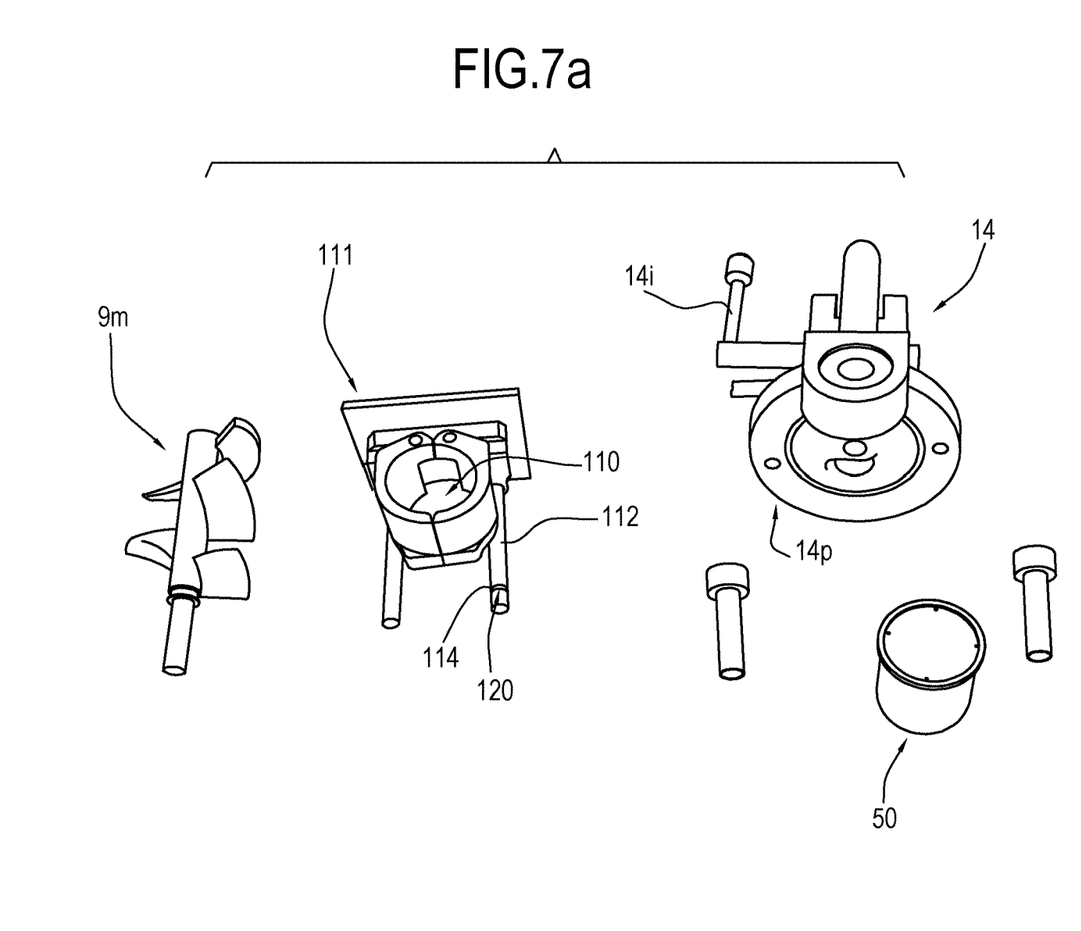
FIGS. 7*a* and 7*b* are exploded views of part of certain component elements of the apparatus according to this invention for containing the single-dose unit, in the case, respectively, of use for ice cream products (FIG. 7*a*) and infusion and extraction products (FIG. 7*b*)

In the first case, that is to say, for the ice cream products, the cavity is indicated with numeral 110 and is positioned on a first carriage 111 equipped with a pair of guides 112 designed to insert in corresponding cavities, not illustrated, forming part of the apparatus (see schematic representation in FIG. 7a).

The guides and the cavities therefore constitute a stable coupling for the carriage.

At the end of one of the guides there is a first magnet 114 which acts as a selector element.

Figure 7B:
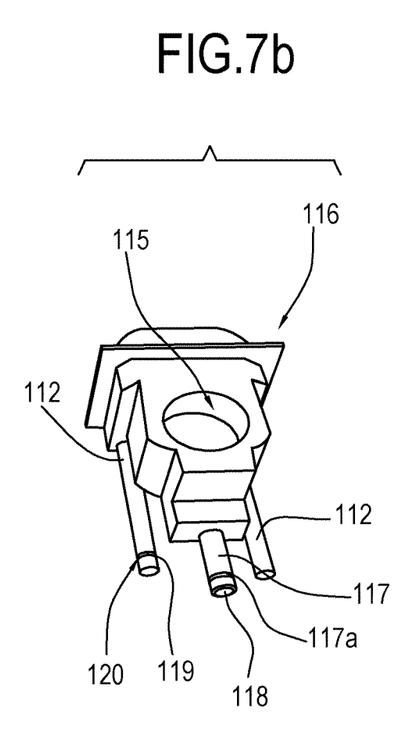
Figure 8:
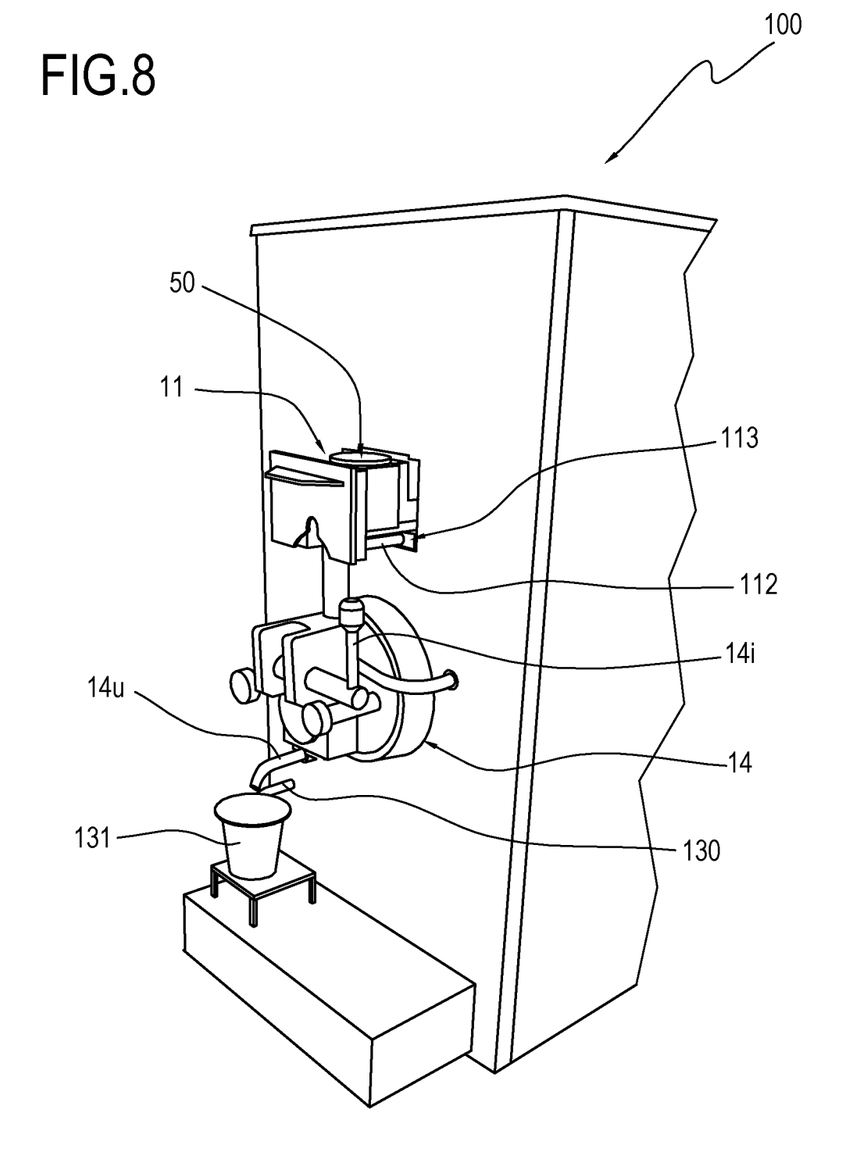
FIG. 8 is a schematic front perspective view of an alternative embodiment of some components of the apparatus according to this invention.

In the second case, that is, for infusion or extraction products (see FIG. 7b), the cavity is indicated with numeral 115, and is positioned on a second carriage 116, corresponding to the previous first carriage 111, but in this the containment cavity is made complementary to the dimensions (smaller) of the capsule and the transfer duct 8 of the product mixture is shaped like a pipe 117 extending horizontally—in this case—the outlet mouth 118 of which directly collecting the product mixture obtained from the capsule. As shown in FIG. 7b, the pipe 117 has, near its end, a seal 117a (O ring) which will couple with a further duct, not illustrated inside the apparatus, the end portion 130 of which is shown in FIGS. 6 and 8.

Also in this second solution there are guides 112 which are used to couple with the cavities not illustrated and forming part of the apparatus. On one of these guides there is a second magnet 119 located at the end of one of the above-mentioned guides different from that of the carriage 111 and acting, as in the previous case, as a selector element.

The above mentioned magnets act as selector elements between hot beverages (that is, infusion or extraction products) and ice cream products; the insertion of the respective carriage will cause the operation of a magnetic or mechanical microswitch (not illustrated) which also forms part of those elements which have been generically defined as selectors mean.

In the embodiment illustrated, the same guides, for example with a different length or the different position of the magnet (as mentioned above), will act as discriminatory element, that is to say, as an element by which the apparatus will recognise whether a capsule for ice cream products or a capsule for infusion or extraction products has been inserted inside it, thereby defining the different setting up of the machine.

These elements have been generically indicated as selector means 120 associated with the housing cavity 11 able to control the transfer of the mixture of product towards a second transfer duct 117 distinct from the first duct 8.

In short:

if the ice cream capsule and the corresponding carriage 111 is used, the solvent would arrive from the dispensing duct 28 (see schematic representation in FIG. 6), pass through the container 50 of FIG. 1 through the holes 59f, mix with the product contained A and, following the path indicated by the arrow F, escape through the bottom hole 58, and pass through the transfer duct 8 to reach the inside of the cooling or mixing chamber 9;

if, on the other hand, the coffee capsule and the corresponding carriage 116 is used, the solvent would still arrive from the dispensing duct 28 (see schematic representation in FIG. 6), pass through the container 50 and, after the mixing, escape directly from the duct 117 and from this towards the duct/spout 130 to the consumer.

More in detail, it should be noted that the mixing means 9m are driven by a motor 10 outside the mixing chamber 9.

If the food product is an ice cream, a sorbet, a cold custard or a water-ice, the mixing chamber can be defined as a mixing and cooling chamber in which the mixing means comprise a helical stirrer (shown in FIG. 6 partly, since of a known type, and more clearly in FIG. 7a) driven by the motor 10.

The final food product has a volume which is greater than that of the respective ingredients, that is, of the mixture being introduced.

In effect, the ice contained in the water-ices occupies a volume which is greater than the corresponding quantity of water, and the ice creams, cold custards and sorbets incorporate a quantity of air greater than 50% and which can reach 100%.

The mixing chamber must, therefore, be suitably sized, taking into consideration the food product to be prepared and the increase in volume that it will undergo following the percentage of air added.

It should be noted that the purpose of the above-mentioned vent hole 99 is to allow and facilitate the introduction of the mixed product inside the mixing chamber, as it determines a connection with the outside, and eliminate (or reduce to a minimum) the over-pressure effect which would otherwise be created inside the closed chamber and with reduced dimensions.

Considering again the over-pressure system 70, which consists of a simple diaphragm pump in the solution illustrated, this can be used not only to favour the discharge of the product already mixed in the respective chamber, but also—according to requirements—to increase the quantity of air inside the chamber 9 in a given moment of the cooling: this is in order to increase the overrun parameters, that is, the quantity of air in the ice cream or in the cold custards. Since the apparatus is conceived as a household device, it is necessary to provide for the possibility of washing the components of the machine even after a single preparation of a dose of product, especially if this is of the ice cream type.

For that purpose, the feeding means 2 are designed for flowing the liquid fed by it, and which, in this case will act as washing liquid, inside the set of components involved, that is to say: in the single-dose containment unit 50, when the single-dose unit 50 is contained in the housing 11; in the transfer duct 8; in the mixing unit and in the dispensing unit.

In short, the cleaning carried out consists of an empty cycle and a cycle with hot liquid (water) which performs a total cleaning of the portions touched by the food product, including the capsule, which, cleaned in this way, may be disposed of as recyclable household waste.

It is important to note that the apparatus has been designed precisely for the purpose of producing also a single dose of product, in particular the case of an ice cream product.

It has been seen above how it is possible, at the end of the operational step of the apparatus, to clean the set of elements involved in the chain of food products used.

In order to further increase the sanitising factor, certain core elements of the above-mentioned chain can easily be removed from the apparatus to be subjected to greater or more convenient cleaning, for example in a dishwasher.

These are illustrated in FIGS. 7a and 7b.

FIG. 7a shows: the mixer (which has the shape of a screw feeder), the carriage 111, the dispensing unit 14 (which in this drawing is illustrated as a circular door 14p for closing the mixing chamber) and, at the end, the capsule 50.

FIG. 7b shows, on the other hand, the respective carriage 115.

Part of the elements illustrated in FIGS. 7a and 7b are also shown in FIG. 8, which constitutes an alternative embodiment to that illustrated in FIGS. 5 and 6.

This means that, with the solution of the apparatus according to this invention, it is possible to compare the use and the routine maintenance of the apparatus with any domestic robot currently provided in a home or the like. It is considered necessary to clarify the definition given previously regarding the mixing chamber 9 which "—precisely because the machine has been designed for single use—is designed to contain a single dose of the mixture deriving from the food product whilst this is mixed by respective mixing means". This means that the volume can also be calculated for dispensing different portions of end product—ice cream. In still more detail, once the production chain using the components specified above takes shape with the product inside the mixing chamber, the user will select whether to deliver a single dose (large ice cream) or several doses (smaller ice creams). This selection may also depend on the choice of the quantity of solvent liquid used, the quantity of the volume of air in the mixing chamber and so on. All these variable do not, however, change the above-mentioned definition of "mixing chamber designed for a single dose". As, moreover, expressed also in the following claims.

The solution illustrated also comprises a method for preparing and dispensing a single dose of food product, wherein the dose is destined to be consumed by a single person in a single use of a portion of the food product, the method comprising the following steps:

- housing, inside a respective housing 11, a single-dose unit of food product 50 in the form of a solute;
- feeding to the single-dose unit a solvent liquid through a dispensing conduit 28;
- transferring the mixture derived from the solvent liquid and the solute food product inside a mixing chamber 9 designed to contain the single dose of the food product in the form of mixture;
- cooling the mixing chamber 9 to a temperature close to the 0° C., mixing the contents of the mixing chamber 9 until obtaining the food product in the form of a defined dose;
- dispensing the defined dose of food product, taking it from the mixing chamber 9, towards the outside in a final packet for the consumer.

The method also comprises the step of introducing, into the mixing chamber 9, air under pressure during the step of dispensing the defined dose, in order to favour the complete discharge from chamber.

The method also comprises the step of cleaning, using the solvent liquid, after dispensing the defined dose, the set of elements touched by the mixture derived from the liquid, including the mixing chamber 9.

Preferably, the method comprises that the cleaning step is performed at a high temperature: the range may be from 60° C. to 98° C., preferably 85° C.

In still more detail, regarding the cleaning step, there are three different modes:
- a fast mode, using an empty capsule 50 and dispensing clean water: this assumes, for example, the change of flavour and colour of the ice cream, such as from chocolate to cream;
- an intense mode, using a capsule 50 which can be defined as special, in which detergent is placed, and making the apparatus perform a cycle as described above;
- a third mode, which can be defined as manual, which consists in removing the door 14p, the capsule-holding carriage 111 and the mixer 9m, and than—as also mentioned previously—cleaning them outside the machine, either by hand or in a dishwasher.

This invention relates to a single-dose unit for preparing ice cream products, wherein the product contained therein comprises a preparation for ice creams made of soluble powder in a solvent liquid.

Preferably, the preparation comprises a mixture comprising at least fats, proteins and sugars.

Also, preferably, the solvent liquid consists of water.

The single-dose unit for preparing ice cream products, wherein the product contained therein comprises a preparation for ice creams made of soluble powder, can be used in an apparatus of the type specified above.

Alternatively, the single-dose unit for preparing ice cream products, wherein the product contained therein comprises a preparation for ice creams made of soluble powder in a solvent liquid which can be used in combination with apparatuses comprising at least one source for feeding a defined liquid solvent, with the preparation consisting of a powder, a mixture, and at least one unit for mixing the mixture at a temperature variable between 0° C. and −10° C.

The solution according to the invention therefore achieves the preset aims as both the apparatus and the method (together with the single-dose unit) allow each dose of selected food product to be produced individually, when requested.

For this reason, according to the invention, there will no longer be waste relating to food product unsold because it is bacteriologically unsuitable for consumption or because it has hardened so much that it does not allow portions to be made.

Moreover, the dose produced does not need to be kept refrigerated for a lengthy time since it does not need not be stored whilst waiting to be sold.

This also results in a reduction of the space occupied by an apparatus for preparing the food product, nor is it necessary to also provide a space for storing the food product in the form ready for use.

The above description is only given by way of a non-limiting example, so any variants of a practical-application nature fall within the protective of the invention as described above and claimed below.

The invention claimed is:

1. An apparatus for preparing and dispensing a single dose of a food product comprising:
   at least one duct for dispensing a solvent liquid and a tank for storing the solvent liquid;
   a heater positioned along the at least one duct for heating the solvent liquid flowing inside the at least one duct;
   a cavity for housing a single-dose unit of the food product comprising an inlet connected to the at least one duct for mixing the heated solvent liquid and the food product;
   a transfer duct coupled to the cavity;
   a mixing chamber, coupled to the transfer duct, for receiving a heated mixture comprising the solvent liquid and the food product fed by the transfer duct inside the mixing chamber, said mixing chamber being provided with a mixer for mixing the heated mixture in the mixing chamber for forming the food product in a single dose;
   a cooling circuit formed around the mixing chamber; and
   a dispenser coupled to the mixing chamber for dispensing the food product formed in the single dose.

2. The apparatus according to claim 1, further comprising a supply pipe coupled to the tank which can be connected directly to a water main.

3. The apparatus according to claim 1, wherein the mixing chamber is designed to contain the single dose of the mixture deriving from the food product while being mixed by the mixer.

4. The apparatus according to claim 1, comprising an over-pressure system, a delivery line of which leads inside the mixing chamber, designed to favour the ejection from the cooling chamber of the product already mixed.

5. The apparatus according to claim 1, comprising an over-pressure system, a delivery line of which leads inside the mixing chamber, designed to increase the quantity of air inside the mixing chamber, in a given moment during the cooling, in order to increase the quantity of air inside the product being processed in the mixing chamber.

6. The apparatus according to claim 1, comprising a device for measuring the softness of the product inside the mixing chamber.

7. The apparatus according to claim 6, wherein the device is an ammeter designed to measure the current absorbed by a motor used for rotating the mixer for mixing the product inside the mixing chamber.

8. The apparatus according to claim 6, wherein the device is a wattmeter designed to measure the power absorbed by a motor used for rotating the mixer for mixing the product inside the mixing chamber.

9. The apparatus according to claim 1, comprising a selector, associated with the cavity, able to control the transfer of the mixture of product towards a second transfer duct distinct from the first duct.

10. The apparatus according to claim 1, wherein, in the case of an ice cream product, the cavity is positioned on a first carriage equipped with a pair of guides designed to be inserted in corresponding cavities forming part of the apparatus; the guides and the cavities constituting a stable coupling device and also allowing an exact positioning of the single-dose unit inside the machine.

11. The apparatus according to claim 10, comprising a first microswitch located at the end of one of the guides for use in defining different operational states of the apparatus.

12. The apparatus according to claim 10, wherein, in the case of an infusion or extraction product, the cavity is positioned on a second carriage, corresponding to the previous first carriage; the second carriage having a containment cavity made complementary to the dimensions of the single-dose unit and the transfer duct of the product being shaped like a pipe the outlet mouth of which directly collects the mixture obtained from the single-dose unit.

13. The apparatus according to claim 12, wherein there are guides designed to couple with the cavities, a second microswitch being positioned on the end of one of the above-mentioned guides for use in defining different operational states of the apparatus.

* * * * *